United States Patent [19]

Su

[11] Patent Number: 4,607,072

[45] Date of Patent: Aug. 19, 1986

[54] POLYOLEFIN COMPOSITION AND METHOD OF PROCESSING SAME

[75] Inventor: Tien-Kuei Su, Pittsford, N.Y.

[73] Assignee: Mobil Oil Corporation, New York, N.Y.

[21] Appl. No.: 729,764

[22] Filed: May 2, 1985

[51] Int. Cl.[4] .............................................. C08K 5/16
[52] U.S. Cl. .................................................. 524/242
[58] Field of Search ................................ 524/229, 242

[56] References Cited

U.S. PATENT DOCUMENTS

| | | | |
|---|---|---|---|
| 2,770,609 | 11/1956 | Symonds, Jr. ...................... | 524/229 |
| 2,991,263 | 7/1961 | Clark et al. ........................ | 524/229 |
| 2,991,265 | 7/1961 | Clark et al. ........................ | 524/229 |
| 3,021,296 | 2/1962 | Ammondson ...................... | 524/229 |
| 3,165,492 | 1/1965 | Tholstrup et al. .................. | 524/229 |
| 3,969,304 | 7/1976 | Pugh et al. ......................... | 524/229 |
| 4,170,588 | 10/1979 | Hegenberg et al. ............... | 524/242 |
| 4,322,503 | 3/1982 | Chatterjee ......................... | 524/229 |
| 4,454,281 | 6/1984 | Heitz et al. ........................ | 524/579 |

*Primary Examiner*—Joseph L. Schofer
*Assistant Examiner*—N. Sarofim
*Attorney, Agent, or Firm*—A. J. McKillop; M. G. Gilman; J. P. O'Sullivan, Sr.

[57] ABSTRACT

A resin composition comprising a polyolefin resin containing a processability enhancing proportion of a compound of the formula $RCONHCH_2CH_2CONHR'$, wherein R and R' are derived from a $C_8$–$C_{24}$ fatty acid.

8 Claims, No Drawings

POLYOLEFIN COMPOSITION AND METHOD OF PROCESSING SAME

The present invention relates to a polyolefin composition of high clarity and exceptional surface smoothness. It also relates to a process for improved processability of polyolefins.

Certain polyolefins in film form inherently develop a haziness as a result of melt fracture during extrusion. Where the end use of this material is for general packaging or wrapping purposes, this constitutes a negative aspect of an otherwise excellent film. The sales appeal of a product is subtly affected by the clarity of the wrapping material.

Linear polyethylene resins, including, linear low density ethylene copolymers (LLDPE) are difficult to process through conventional blown film equipment designed for branched polyethylene. They are limited to a lower output rate because of high head pressure and power consumption. This results from its melt rheological characteristics (high shear viscosity). In addition, linear polyethylene films and bags generally reveal poor appearance due to melt fracture. It has been concluded that the melt fracture mechanism for linear polyethylenes is different from the branched species. Furthermore, linear polyethylenes in clear film packaging is, as indicated above, limited because of its poor optical properties. The optical properties of linear polyethylene films is related to the rheological behavior of the melt and the morphological nature of the resin.

Any innovation which would improve the processability and the physical characteristics of such films would be highly desirable.

It is an object of the present invention to improve the processability of polyolefin resin into any form.

It is another object of the present invention to improve the clarity of polyolefin films.

It is a further object of the present invention to specifically improve the clarity of linear low density polyethylene films.

SUMMARY OF THE INVENTION

The present invention is directed to a resin composition of comparatively high clarity and transparency comprising a polyolefin containing clarifying a proportion of a compound of the formula:
$RCONHCH_2CH_2CONH'$ wherein R and R' are $C_8-C_{24}$ fatty acid residues.

The present invention is also directed to polyolefin articles of exceptional smoothness and clarity, said articles including a compound of the formula: $RCONHCH_2CH_2CONHR'$ wherein R and R' are as above defined.

The method of improving the processability of polyolefins comprising incorporating therein a compound of the formula:
$RCONHCH_2CH_2CONHR'$, wherein R and R' are as described above. This combination is melt mixed and extruded into a suitable shape to reveal a polyolefin structure of exceptional clarity and smoothness.

DETAILED DESCRIPTION OF THE INVENTION

As indicated above, the invention relates to the incorporation of a long chain fatty diamide to the subject polyolefins. In addition to the enhanced clarity and smoothness of the extruded material, it has been observed that the subject additive has improved the processability of the subject resins. By improved processability is meant a reduction in head pressure, a reduction in power consumption or an increase in output rate of the extruded polyolefin. The invention is illustrated by the following examples.

The instrument employed to evaluate melt fracture was an Instron Capillary Rheometer (Model 3211). The diameter of the resulting capillary rod was 0.05 inch and the corresponding length was two inches. The die used in this system had a 90° entry angle. The surface texture of the extruded samples were examined by using an optical microscope.

EXAMPLE 1

In this example the LLDPE employed was a commercially available copolymer of ethylene with about 1–10 mole percent of butene-1. This material is available from Union Carbide Corp. as GP2 (GERS 7042). A rod of the dimensions described above was extruded through the Instron Capillary Rheometer.

EXAMPLES 2 and 3

Two sample rods were prepared using the technique of Example 1 employing the same LLDPE except Example 2 contained 0.5% by weight of Kenamide W-20 and Example 3 contained 1.0% by weight of Kenamide W-20. Kenamide W-20 is $RCONHCH_2CH_2CONHR'$ wherein R and R' are the residues of oleic acid. This material is available from Witco Corporation, Memphis, TN. The rods were extruded through the above described capillary die at a shear rate of 450 sec$^{-1}$ and at a temperature of 190° C. The three rod samples from Examples 1, 2 and 3 were examined through an optical microscope and photographs were taken at a profile magnification of 10×. The side profile view of the rod of Example 1 was of sawtoothed appearance having as many as 20 peaks per linear inch at the magnification in the photographs. The rod samples of Example 2 and 3 on the other hand showed perfectly smooth profiles with no sawtooth peaks.

Next a series of melt extrusions were carried out in order to show the affect that the diamide had on processing conditions.

EXAMPLES 4–7

In these examples, a commercially available LLDPE identified as UC 7068 was employed. This material is a linear low density copolymer of ethylene with from 1–10 mole percent hexene-1. This material is commercially available from the Union Carbide Corporation. As shown by the following Table, samples containing 0, 0.25, 0.50 and 1.00 weight percent of the same additive employed in Examples 2 and 3 were prepared. To show the affect that the additive material had on the extrusion of LLDPE two extruders were employed: (1) a 1½ inch Killion extruder having a screw with a L/D ratio of 32 and (2) a 2½ inch Sterlex with a 4.5 inch die. Other details of the melt extrusion is shown in Table I.

TABLE I

|  | Example | | | |
|---|---|---|---|---|
| Additive[b] Level (%) | 4<br>0[a] | 5<br>0.25 | 6<br>0.50 | 7<br>1.00 |
| Head Pressure[c] (psi) | 3850 | 3800 | 3550 | 3200 |
| RPM | 75 | 75 | 75 | 75 |
| Amperage | 45 | 41 | 39 | 36 |
| Output (lbs/hr) | 29 | 28 | 27 | 24 |
| Head Pressure[c] (psi) | 3850 | 3850 | 3850 | 3850 |

TABLE I-continued

| Additive[b] Level (%) | Example | | | |
|---|---|---|---|---|
| | 4 | 5 | 6 | 7 |
| | 0[a] | 0.25 | 0.50 | 1.00 |
| RPM | 75 | 83 | 90 | 107 |
| Amperage | 45 | 43 | 42 | 45 |
| Output (lb/hr) | 29 | 31 | 35 | 37 |
| Head Pressure[d] (psi) | 4600 | 4500 | 4500 | 4100 |
| RPM | 17 | 17 | 17 | 17 |
| Amperage | 44 | 42 | 40 | 32 |
| Output (lb/hr) | 57 | 57 | 60 | 57 |

[a]UC 7068 (Union Carbide GERS 7068) base resin of all examples
[b]Kenamide W-20
[c]1.5" Extruder with adaptor
[d]2.5" Extruder with 4.5" die As is clear from a review of the data of Table I the improvement in processability during the extrusion process shows a significant reduction in head pressure, power consumption or increase of output rate as a result of the incorporation of the subject diamide.

EXAMPLES 8 and 9

Using conventional equipment two samples of tubular blown film were prepared. Example 8 was a film made from the LLDPE, UC 7068 and in Example 9 the film was made from the same UC 7068 but contained 1.0 wt. % of the Kenamide W-20. In both cases the film was 1.5 mils in thickness and except for the presence of the diamide in Example 9, the films were made under identical conditions. A noticeable difference in transparency was noted on examining both films. The film of Example 8 has a haze number of 17 and the film of Example 9 has a haze number of 10 as measured using ASTM test number D1003. Thus, the film of Example 9 has markedly superior clarity.

Beneficial results can be obtained by employing up to about 5.0 wt. % of the diamide.

What is claimed is:

1. A resin compsition comprising a linear low density copolymer of ethylene with from 1–10 mole percent of a $C_3$–$C_{10}$ alpha olefin containing a processability enhancing proportion of a compound of the formula RCONCH$_2$CH$_2$CONHR', wherein R and R' are derived from a $C_8$–$C_{24}$ fatty acid.

2. An extruded article of high clarity and surface smoothness comprising a linear low density copolymer of ethylene with from 1–10 mole percent of a $C_3$–$C_{10}$ alpha olefin containing a clarifying proportion of a compound of the formula RCONHCH$_2$CH$_2$CONHR', wherein R and R' are derived from a $C_8$–$C_{24}$ fatty acid.

3. The extruded article of claim 2 in film form.

4. The film of claim 4 wherein R and R' are derived from a $C_{12}$–$C_{18}$ fatty acid.

5. The film of claim 4 wherein R and R' are a member selected from the group consisting of the residue of oleic acid, stearic acid, and hydrogenated tallow.

6. The film of claim 5 wherein R and R' are the residues of a $C_{18}$ fatty acid.

7. The film of claim 6 wherein R and R' are the residues of oleic acid.

8. The method of increasing the processability of a linear low density copolymer of ethylene with from 1–10 mole percent of a $C_3$–$C_{10}$ alpha-olefin comprising including therein a compound of the formula: RCONHCH$_2$CH$_2$CONHR', wherein R and R' are the residues of a $C_8$–$C_{24}$ fatty acid.

* * * * *